US008080889B2

(12) United States Patent
Ippolito et al.

(10) Patent No.: US 8,080,889 B2
(45) Date of Patent: Dec. 20, 2011

(54) AEOLIAN SYSTEM COMPRISING POWER WING PROFILES AND PROCESS FOR PRODUCING ELECTRIC ENERGY

(75) Inventors: Massimo Ippolito, Chieri (IT); Franco Taddei, Cologno Monzese (IT)

(73) Assignee: Kite Gen Research S.r.l., Milan (IT)

( * ) Notice: Subject to any disclaimer, the term of this patent is extended or adjusted under 35 U.S.C. 154(b) by 427 days.

(21) Appl. No.: 12/297,406

(22) PCT Filed: Apr. 24, 2006

(86) PCT No.: PCT/IT2006/000279
§ 371 (c)(1),
(2), (4) Date: Oct. 16, 2008

(87) PCT Pub. No.: WO2007/122650
PCT Pub. Date: Nov. 1, 2007

(65) Prior Publication Data
US 2009/0097974 A1  Apr. 16, 2009

(51) Int. Cl.
*F03D 9/00* (2006.01)
*H02P 9/04* (2006.01)
(52) U.S. Cl. .......................................... 290/44; 290/55
(58) Field of Classification Search .................. 290/44, 290/55; 244/153, 33 R
See application file for complete search history.

(56) References Cited

U.S. PATENT DOCUMENTS

| | | |
|---|---|---|
| 3,987,987 A | 10/1976 | Payne et al. |
| 4,124,182 A | 11/1978 | Loeb |
| 5,056,447 A | 10/1991 | Labrador |
| 5,435,259 A | 7/1995 | Labrador |
| 5,931,416 A | 8/1999 | Carpenter |
| 6,072,245 A | 6/2000 | Ockels |
| 6,254,034 B1 * | 7/2001 | Carpenter ................. 244/153 R |
| 6,523,781 B2 * | 2/2003 | Ragner ..................... 244/153 R |
| 7,546,813 B2 * | 6/2009 | Wrage ....................... 114/102.1 |

(Continued)

FOREIGN PATENT DOCUMENTS

CN    1052723 A    7/1991

(Continued)

OTHER PUBLICATIONS

International Search Report (PCT/ISA/21) issued in PCT/IT2006/000279, Jan. 10, 2007.

(Continued)

*Primary Examiner* — Tulsidas C Patel
*Assistant Examiner* — Stefan Mikailoff
(74) *Attorney, Agent, or Firm* — Edwards Wildman Palmer LLP; Peter C. Lauro, Esq.

(57) ABSTRACT

An aeolian system is described for converting energy comprising at least one power wing profile (30) which can be driven from the ground immersed in at least one aeolian current (W) and a basic platform (1) for controlling the wing profile (30) and generating electric energy placed at ground level and connected through two ropes (2) to the power wing profile (30), such basic platform (1) being adapted to drive the wing profile (30) and to generate electric energy, such two ropes (2) being adapted to transmit forces from and to the wing profile (30) and to be used both for controlling a flight trajectory of the wing profile (30) and for generating energy. A process is further described for producing electric energy through such aeolian system.

22 Claims, 5 Drawing Sheets

U.S. PATENT DOCUMENTS

| | | |
|---|---|---|
| 2004/0035345 A1 | 2/2004 | Lundgren |
| 2004/0200396 A1 | 10/2004 | Page |
| 2005/0046197 A1 | 3/2005 | Kingsley |
| 2005/0280264 A1* | 12/2005 | Nagy .............................. 290/55 |
| 2007/0120005 A1* | 5/2007 | Olson ............................. 244/33 |

FOREIGN PATENT DOCUMENTS

| | | |
|---|---|---|
| DE | 28 39 918 A1 | 3/1980 |
| DE | 32 09 368 A1 | 9/1993 |
| DE | 43 19 823 A1 | 12/1994 |
| DE | 10 2004 018814 A1 | 11/2005 |
| EP | 0 841 480 A1 | 5/1998 |
| EP | 1 672 214 A | 6/2006 |
| FR | 2 475 148 A1 | 8/1981 |
| GB | 2317422 A | 3/1998 |
| JP | 2004 232461 A | 8/2004 |
| NL | 1017171 C | 7/2002 |
| WO | 03097448 A1 | 11/2003 |
| WO | 2005100147 A1 | 10/2005 |
| WO | 2005100148 A1 | 10/2005 |
| WO | 2005100149 A1 | 10/2005 |
| WO | WO 2005100147 A1 * | 10/2005 |

OTHER PUBLICATIONS

Written Opinion (PCT/ISA/2370 issued in PCT/IT2006/000279), Jan. 10, 2007.

Ippolito: "The KiWiGen Project" Internet Citation, [Online} XP002343508, Retrieved from the Internet: URL: http://europa.eu.int/comm/research/energy/pdf/other_res_02ippolito.pdf> [retrieved on Sep. 5, 2004].

* cited by examiner

AEOLIAN SYSTEM COMPRISING POWER WING PROFILES AND PROCESS FOR PRODUCING ELECTRIC ENERGY

This application is the U.S. national phase, pursuant to 35 U.S.C. §371, of PCT international application Ser. No. PCT/IT2006/000279, filed Apr. 24, 2006, designating the United States and published in English on Nov. 1, 2007 as publication WO 2007/122650 A1. The entire contents of the aforementioned patent applications are incorporated herein by this reference.

The present invention refers to an aeolian system for converting energy through at least one power wing profile. The present invention further refers to a process for producing energy through such system.

As known, in the past the problem has been dealt with of producing electricity at low cost by exploiting renewable energy sources; in particular, in some prior patents described below, processes have been proposed for converting aeolian energy and different devices which subtract aeolian energy to the wind through power wing profiles (generally designated with the term "kite").

In particular, U.S. Pat. No. 4,124,182 discloses a device equipped with "parakite" (or "modified parachute") to capture aeolian energy and convert it into a rotary motion of a shaft which actuates a generator. This device is characterised by a pair of "trains of parakite" in which the wing profiles are arranged in series. Each train is equipped with a power rope. Such cables are long enough to allow the trains of parakite to reach heights at which stronger and more uniform winds blow with respect to those which blow at earth surface level. Every train is constrained through its corresponding power rope to a drum or a winch whose rotation direction can be alternated in order to rewind the ropes or allow unwinding the ropes due to the traction of the aeolian currents. Every train of parakite is equipped with a second rope, called "cap rope", connected to each train wing profile and through which it is possible to selectively collapse the parakite to make the rewinding procedure easier. Through a reducer, the rotary motion of each winch is transferred to a generator which, when actuated, produces electricity. There is a single system of pulleys which, through clutches and wheels, enables that, while a train of parakite ascends, the other is recovered. The captured aeolian energy is therefore converted into mechanical energy which is partly immediately spent for recovering the train of parakite whose cap has been closed, and partly is converted into electric energy. Through an aerostatic balloon constrained to each train and inflated and deflated at every operating cycle, the parakites are kept at a desired altitude and the cap with a fixed orientation.

Chinese patent CN 1,052,723 discloses an aeolian current generator equipped with a pair of kites through which the traction exerted by the aeolian currents is converted, through high-resistance ropes, into rotation of a drum placed at ground level. The winch actuates an hydraulic motor through which the current production occurs.

British patent GB 2,317,422 discloses a device equipped with multiple wing profiles which, due to the effect of wind action, rotate a vertical shaft connected to a generator for producing current. The wing profiles are pushed by the wind performing a circular path in the horizontal plan. Every profile is equipped with a device which is able to modify the wind attachment angle in order to guarantee flight continuity.

U.S. Pat. No. 6,072,245 discloses a device for exploiting aeolian energy composed of multiple kites connected to ropes which form a ring. The kites are driven in order to alternate an ascending path and a descending path determining a rotary ring motion always along the same direction. Every kite is connected to a power rope for transmitting mechanical energy and to a system of driving ropes for adjusting the wind attachment angle of each profile. The power rope determines the rotation of pulleys through which the production of electricity occurs. The driving ropes are used for making each kite assume a position which, in the ascending path, allows the wing profile to be dragged upwards by the wind, and a second position in the descending path so that the wing profile is subjected to an aeolian thrust of a lower entity.

U.S. Pat. No. 6,254,034 discloses a device equipped with a wing profile ("tethered aircraft") pushed by the aeolian currents at a controlled speed, in order to exploit the wind aeolian energy. The wing profile is connected through a rope to a winch which actuates a generator for producing electric energy. On board the profile, a driving system is assembled which detects and modifies the wind attachment angle and modifies the intercepted wind front area. Such system is controlled from the ground by an operator who reads on a display data transmitted from suitable sensors, or automatically through a remote control system. The kite is driven in order to ascend downwind with a high attachment angle. After ending its ascension, the attachment angle is reduced and the profile glides in order to go upwind. The profile is recovered, glides again downwind and the cycle is repeated.

Dutch patent NL 1017171C discloses a device similar to the previously described one in which however the manual driving mode is not provided, and in which the recovery of the wing profile occurs by inclining the kite as a flag, in order to minimise the wind thrust when rewinding the ropes.

U.S. Pat. No. 6,523,781 discloses a device composed of a wing profile ("airfoil kite") through which the aeolian energy is captured, having an entry edge, an exit edge and two side edges. Such profile is driven through a mechanism supported by the kite itself. This device is equipped with ropes connected to the profile edges and the kite is driven by modifying, through such ropes, the pitch angle. The driving mechanism is supplied by electric cables placed inside a power rope which connects the kite to a winch which actuates a generator for producing electricity. The wing profile ascends pushed by the wind by exploiting the lift force and describing an almost perpendicular path to the wind speed direction. After having ended its ascension, the kite is recovered and afterwards driven in order to again capture the wind.

United States application US2005046197 discloses a device equipped with a wing profile ("kite") for exploiting the aeolian energy which generates electricity by actuating, by means of ropes, a winch connected to a generator. The kite is driven through additional ropes through which the wind attachment angle is modified. The profile ascends with a high attachment angle. After having ended its ascension, the attachment angle is minimised and the profile is recovered in order to start the cycle again.

As can be noted by analysing the existing prior art, in known systems the mechanical kite driving components are different from the power generating components and the wing profiles are driven through mechanisms which are directly installed on the kite or through at least four auxiliary ropes whose unwinding and rewinding occurs by means of different winches from those used for generating electricity and controlled by systems placed at ground level or suspended from the ground, therefore supported by the kite itself.

Moreover, in many existing systems, the wing profile is driven in order to generate electricity by mostly exploiting the drag force (namely the component of the aeolian thrust which is parallel to the wind speed). In other systems, the kite operating cycle is characterised by the continuous alternance of an ascension which occurs by exploiting the lift force (namely the component of the aeolian thrust which is perpendicular to the wind speed) and a descent which occurs by minimising such force.

Moreover, in existing systems, attention has been focused exclusively on the chance of producing electricity with continuity through a cyclic process, neglecting the realisation of possible systems which allow maximising the energy which can be exploited from the wind.

Moreover, currently the production of current starting from the aeolian energy occurs inside plants by means of unmovable devices. As regards the exploitation of this renewable energy, therefore, there are no devices which can be transported through which it is possible to produce current in any place in which there is wind. A similar potentiality would instead offer enormous advantages in contexts in which the production of current nowadays occurs exclusively through continuity groups (fuel motor-generators), such as for example in field hospitals.

Currently, however, the problems related to the control system of a power wing profile are solved in detail in an extremely limited number of projects and researches, mainly focused on the increase of productivity in already existing systems instead of the development of new energetic production systems.

In the past, different arrangements have also been proposed, related to dragging boats by means of devices which capture aeolian currents through power wing profiles.

In particular, British patent GB 2,098,951 discloses a device for dragging boats through a train of power wing profiles. The launch of the profiles occurs starting from the launch of a pilot profile which lifts a pair of ropes, which operate as guides for launching the other profiles. The guiding ropes are unwound till all power profiles have reached an adequate height. In order to prevent the profiles from starting to rock when ascending, some of them are lowered or reefed before being deployed for capturing the aeolian currents. After that all power profiles have reached the suitable height, their ascension is ended and the pilot profile is recovered or pulled in a storage pipe placed at the head of the train of power wing profiles.

U.S. Pat. No. 5,056,447 discloses a device for converting aeolian energy into mechanical energy through a system composed of sails placed at different heights and whose concavity is downward oriented. Such device behaves as a power wing profile dragged by ascensional aeolian currents. This device can be used for ground, water or sky transports, on rails or for producing electric energy by rotating vanes which actuate a generator.

U.S. Pat. No. 5,435,259 discloses a device for exploiting high-altitude aeolian currents, for generating electric energy or for dragging vehicles on the ground or on water. The passenger on board the vehicle drives a system composed of power wing profiles which behaves like a common glider. The vehicle, operating as a movable anchor, is equipped with an overturning-preventing control system characterised by a control rope wound around the central vehicle section and a bar which extends over both vehicle sides. Such bar appears as a section of rail which pushes the lower rope end, which anchors the power profiles to the vehicle, far from the downwind sides, thereby avoiding their overturning. The power profiles system is equipped at its upper end with cylindrical aerostatic balloons to support the load if there is scarce wind. Such balloons further have aeolian turbines at their ends, through which electric energy is produced.

International application WO03097448 discloses a device for dragging boats through a power wing profile. Such device is equipped with at least one "check rope" through which the wing profile is connected to the boat body. The application point of the force transmitted by the check rope(s) to the boat body is variable depending on wind along the boat advancement direction. Such application point in fact slides inside a perimeter guide assembled on the boat hull in order to reduce heeling.

United States application US2004035345 discloses a device for driving a power wing profile anchored to a boat through at least one pair of "suspension ropes". The control instrument of the wing profile comprises a rail which horizontally extends below the water surface and on which a device is assembled for deviating the suspension ropes which is able to slide along the rail. Such guide is constrained to the boat body between the power wing profile and the system through which the profile is driven, so that the traction exerted by the wing profile generates a moment around the longitudinal and/or transverse axis of the boat in water, by means of which the boat downwind is pushed upwards.

United States application US2004200396 discloses three methods through which it is possible to generate a thrust next to the hull of a boat to guarantee its advancement on the water surface. The first method consists in placing the sails on stern and in inclining them towards the wind (outside the boat), in order to create a thrust. The second method consists in using a power wing profile anchored at prow and driven in order to fly high and in front of the boat, thereby generating a traction which advances the boat. The third method consists in a keel equipped with a wide plane plate, upwards inclined in order to advance through water generating a thrust which tends to lift the hull. This patent also discloses revolutionary sails made of bands of fabric which extend through a frame which appears as a grating. These sails are made in order to oppose the aeolian currents when they are pushed against the grating and allow the passage of wind when this latter one blows along an opposite direction, making the bands of fabric go away from the frame.

International application WO2005100147 discloses a device for dragging boats through a power wing profile anchored to the hull by means of a rope. Such device is used as exclusive, auxiliary or emergency guiding unit. The system is equipped with a winch comprising means through which the rope is rewound and unwound. Rewinding occurs when the traction on the rope is insufficient, or the wind speed suddenly decreases. Rope unwinding occurs when the rope load and/or the wind speed are excessive.

International application WO2005100148 discloses a device for dragging boats through a power wing profile anchored to the hull by means of a rope. Such device is used as exclusive, auxiliary or emergency guiding unit. The wing profile is driven by a control apparatus which guides the profile making it perform helical or sinusoidal trajectories which extend along a vertical direction with respect to aeolian currents, with a speed vector perpendicular to wind speed. The different trajectories or the static flight condition are selected through the control system, taking into account course, direction and wind speed and sea motion.

International application WO2005100149 discloses a device for dragging boats through a power wing profile. Such device is used as exclusive, auxiliary or emergency guiding unit. The wing profile is connected to the boat by means of a rope which opens as a fan in a series of cables next to the wing profile. A driving system supported by the wing profile and connected thereto modifies the wind attachment angle in order to adjust the position of the wing profile with respect to the boat.

German patent application DE102004018814 discloses a device for dragging boats through a power wing profile anchored to the hull by means of a rope. Such profile can be driven through an apparatus which can be assembled on azimuth, supported by the profile itself, and through which the profile is guided by the boat. The device is also equipped with a receiving system which supports the wing profile when the system is not operating, and with automatically triggered devices through which the profile is lowered.

Therefore, object of the present invention is solving the above prior art problems by providing an aeolian system for converting energy through at least one power wing profile in which the mechanical driving components of the wing profile are not different from the power generating components.

Another object of the present invention is providing an aeolian system for converting energy through at least one power wing profile in which such profile is driven by a smart control system which, upon every operating cycle, makes the wing profile perform an optimum path in order to optimise the aeolian energy which can be subtracted from the wind.

A further object of the present invention is providing an aeolian system for converting energy through at least one power wing profile in which the encumbrance of its components placed on the ground is so limited that their transport is made possible also with a common motor vehicle.

Moreover, an object of the present invention is providing a process for producing electric energy through an aeolian system according to the present invention, which can be actuated more efficiently with respect to what is proposed by the prior art.

The above and other objects and advantages of the invention, as will appear from the following description, are obtained with an aeolian system for converting energy through a power wing profile as claimed in claim 1.

Moreover, the above and other objects and advantages of the invention are obtained with a process for producing electric energy through an aeolian system according to the present invention as claimed in claim 24.

Preferred embodiments and non-trivial variations of the present invention are the subject matter of the dependent claims.

The present invention will be better described by some preferred embodiments thereof, provided as a non-limiting example, with reference to the enclosed drawings, in which.

Figure 1:
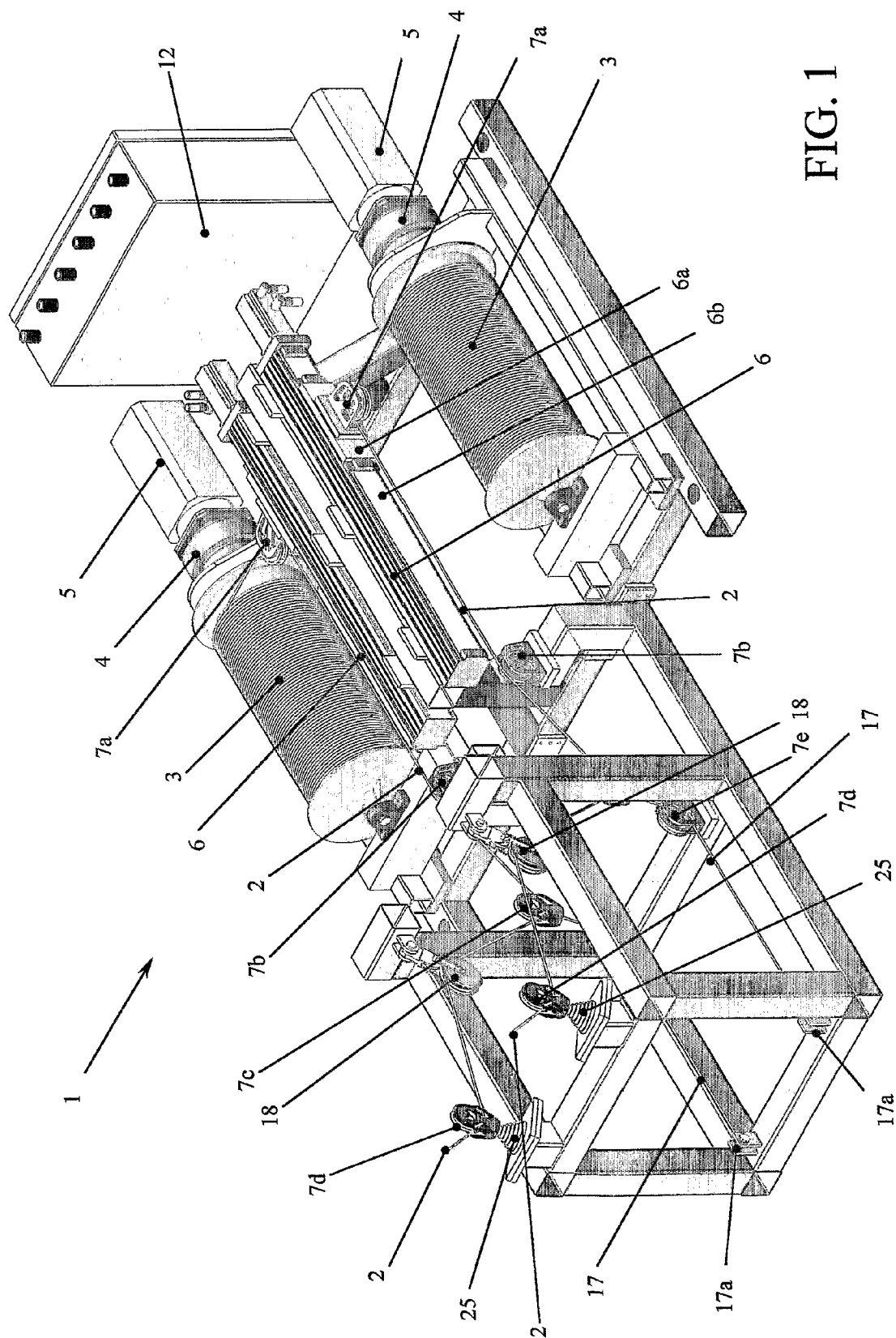
FIG. 1 shows a perspective view of a preferred embodiment of a component of the system according to the present invention.

With reference to the Figures, it is possible to note that the aeolian system for converting energy according to the present invention comprises:

at least one power wing profile 30, which can be driven from the ground (herein below, for conciseness, also designated with the term "kite") and immersed in the aeolian currents to be captured. Such wing profile is made by weaving fibers which are commonly used for manufacturing specific sails for certain sports activities, such as for example surf and kart. A major specification that characterizes the kite is the surface area. Thanks to recent aerodynamic studies, wing profiles are available on the market that are able to satisfy certain needs in terms of control and drivability. By suitably driving a wing profile, it is possible to modulate the energetic transfer from the wind. In particular, it is possible to guide the kite 30 along a flight trajectory taking it from a position in which the traction exerted by the aeolian currents in which the wing profile 30 is immersed is maximum to an approximate stall position (which can be on azimuth or lateral), in which such traction is minimum. It is by cyclically alternating from a step of maximum traction to a step of an approximate stall and following recovery that the generation of electric energy occurs, as will be described below in more detail;

a basic platform 1, adapted to drive the wing profile 30 and to convert the aeolian energy of the aeolian current into electric or mechanical energy, placed at ground level and connected through two ropes 2 to the power wing profile 30, such two ropes 2 being adapted to transmit forces from and towards the wing profile 30 and used both for controlling the flight trajectory of the wing profile 30 and for transmitting energy, in the modes which follow. It is possible to provide for many power wing profiles 30 mutually connected in series, in order to sum the pull onto the ropes 2. The wing profiles 30 are in fact connected to the basic platform 1 through a single system of ropes 2. For easiness, herein below reference will be made to the case in which the aeolian system according to the present invention is equipped with a single wing profile 30. The operating principle of the aeolian system according to the present invention in fact does not depend on the number of wing profiles 30 which are used. The advantage deriving from the use of many power wing profiles 30 consists in increasing the surface of the wind front intercepted by such profiles and consequently in increasing the pull on winches 3 and the electric energy which can be generated upon every operating cycle, as will be described below in more detail.

Moreover, the system according to the present invention comprises a smart control system operating on the basic platform 1 through which the flight of the wing profile 30 is automatically governed and a supply system 12 cooperating with such smart control system for managing the electric energy accumulation and delivery.

The smart control system cooperates with a set of sensors with autonomous supply placed on the wing profile 30 that sends information, preferably in a wireless mode, to the ground components of the smart control system. The smart control system integrates these pieces of information with other information coming from a set of ground sensors (for example the load rope value determined by reading the motor torque) and processes the data to automatically drive the wing profile 30 during its whole operating cycle.

Figure 2:
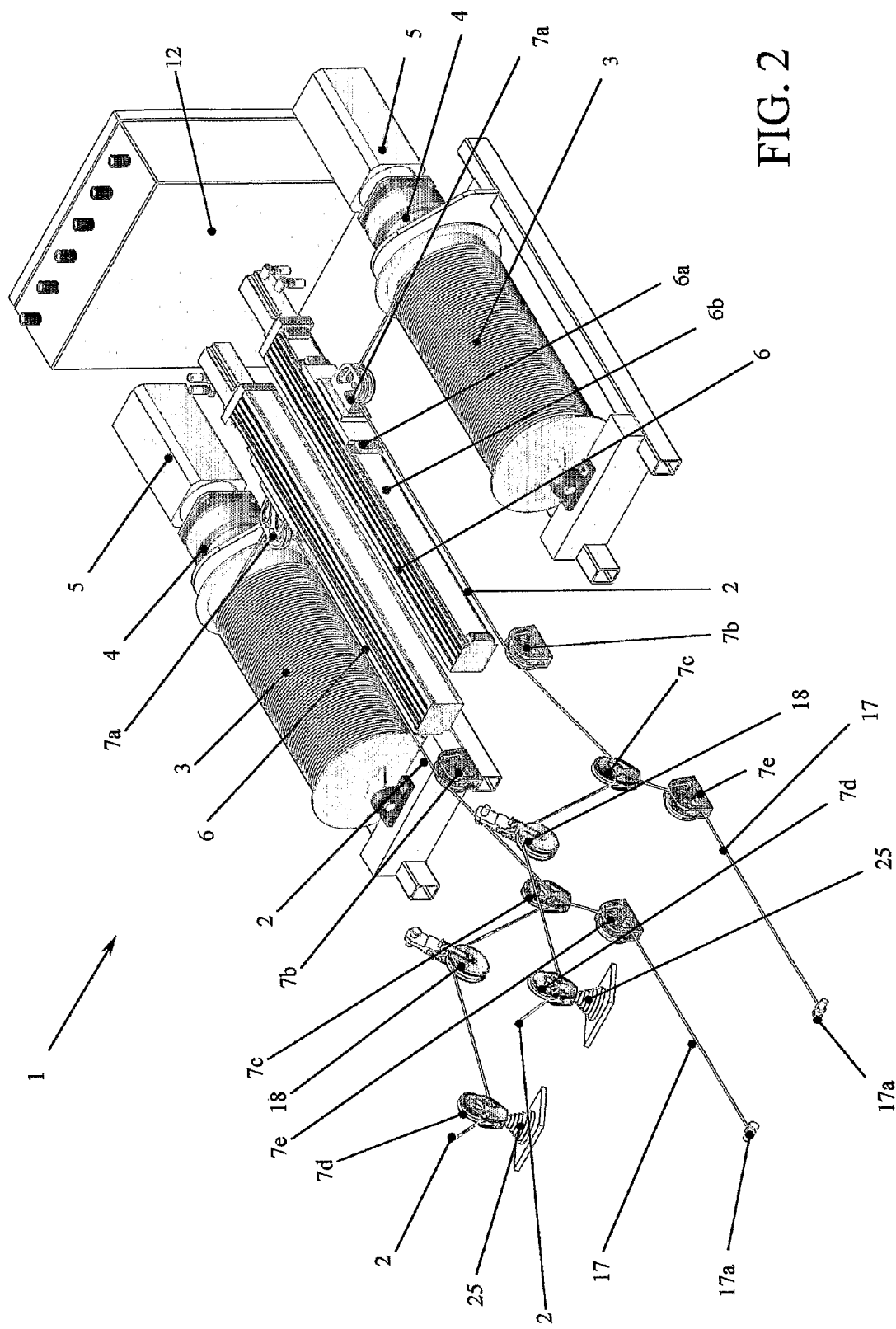
FIG. 2 shows another perspective view of the component of FIG. 1.

With particular reference to FIGS. 1 and 2, it is possible to note that the basic platform 1 comprises at least two winches 3 on each one of which a respective rope 2 is wound or unwound, each one of such winches 3 being connected, possibly by interposing at least one reducer 4, to an electric generator/motor 5. Next to each winch 3 there is a guiding module 6 which compels each rope 2 to be orderly wound on its respective winch 3 and a transmission system which guides each rope 2 towards the wing profile 30. The wing profile 30 is therefore driven by unwinding and rewinding the ropes 2 on their respective winches 3. The ropes 2 are therefore the connection member between kite 30 and basic platform 1 and allow transferring the force between kite 30 and winches 3. When the kite 30 is lifted by the wind, the ropes 2 determine the rotation of the winches 3 and, consequently, the energy conversion by means of generators 5. Instead, during the recovery of the kite 30, the ropes 2 transmit to the wing profile 30 the tension generated by rotating the winches 3 by means of the motors. Obviously, length and diameter of each rope 2 depend on wind and safety conditions under which one wants to operate.

The transmission system comprises blocks which accompany the ropes 2 through pulleys. In the preferred embodiment shown in the Figures, the transmission system is composed in particular of:

a first pair of blocks 7a assembled on sliding blocks 6a of the guiding modules 6 of the ropes 2;

a second pair of blocks 7b placed downstream of the guiding modules 6 of the ropes 2 and adapted to keep horizontal the lengths of rope 2 included between these same blocks 7b and those assembled on the sliding blocks 6a of the guiding modules 6;

a third pair of blocks 7d adapted to send the ropes 2 towards the wing profile 30;

at least one pair of mechanisms for attenuating sudden load variations, included between the second 7b and the third 7d pair of blocks. Each one of such mechanisms is composed of at least one elastic member 17, such as for example an elastic cable or a spring, which, next to one of its ends 17a, is anchored to the basic platform 1 and at the other end is cooperating with a length of rope 2 downstream of the guiding module 6, such elastic member 17 being possibly sent between such two ends of it to a fifth block 7e. The cooperation between the elastic members 17 and the ropes 2 occurs by interposing a fourth block 7c. When a wind blow occurs, the elastic members 17 are stretched, attenuating the sudden load variation. Vice versa, if the load suddenly decreases, the elastic members 17 shrink, partly compensating the delay with which the smart control system, described below, intervenes, in order to accommodate the tension decrease. The transmission system shown in the Figures is preferably equipped with two of the mechanisms for attenuating sudden load variations as previously described, one next to each winch 3.

The transmission system further comprises a pair of tensioning devices 18, one for each rope 2, arranged between the mechanisms for attenuating sudden load variations and the third pair of blocks 7d, which accompany the ropes 2 towards the wing profile 30.

Figure 3B:
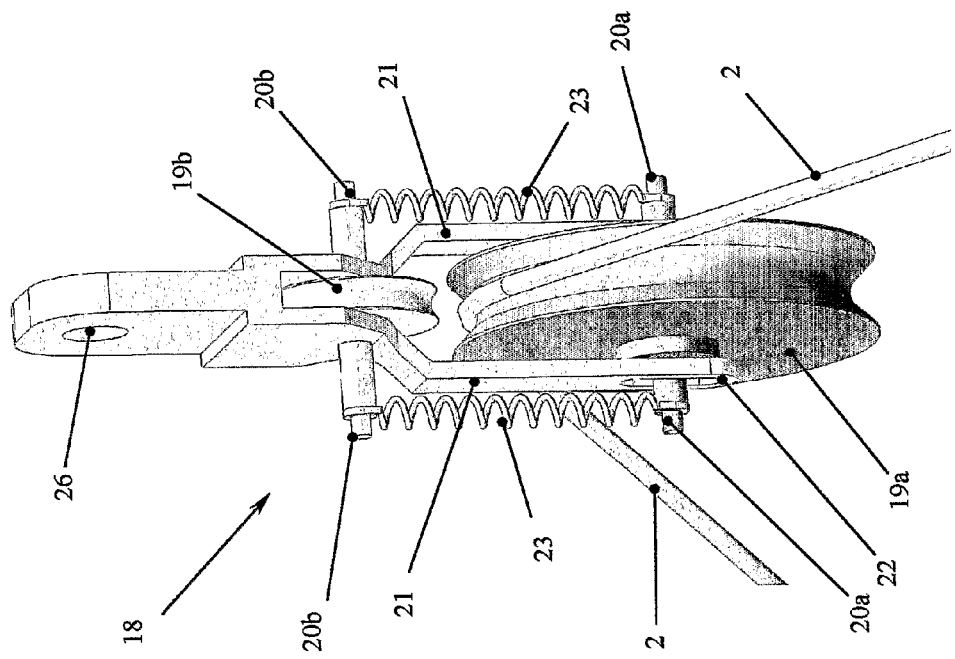
FIG. 3b shows a perspective view of the component of FIG. 3a in another one of its operating positions.
Figure 3A:
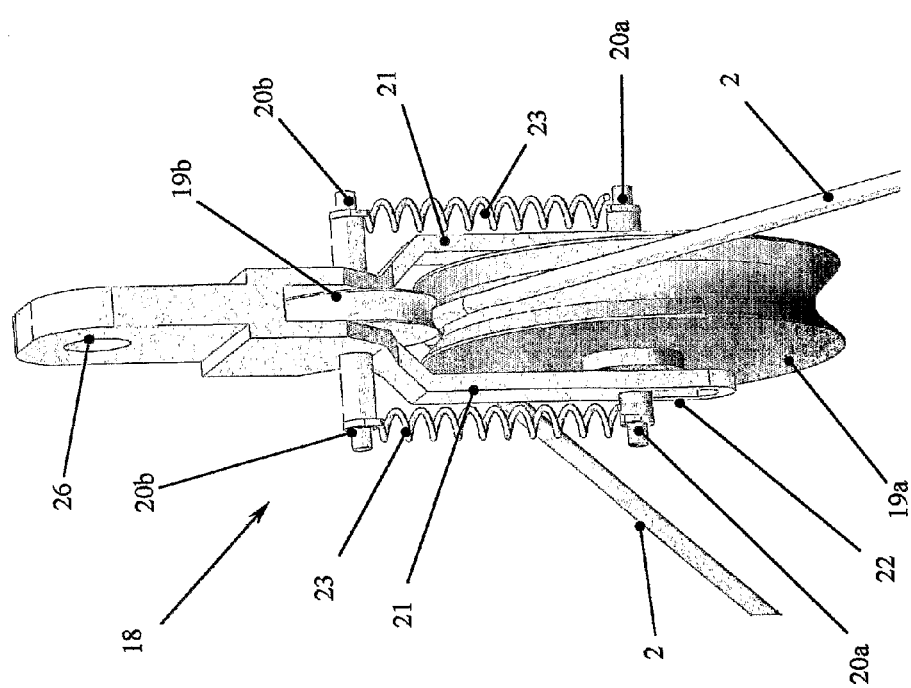
FIG. 3a shows a perspective view of a preferred embodiment of another component of the system according to the present invention in one of its operating positions.

With reference to FIGS. 3a and 3b, it is possible to note that such device 18 is composed of a first 19a and a second 19b pulley that are mutually faced and have a coplanar rotation axes. The pulleys 19a, 19b rotate around a respective first 20a and second 20b rotation pin and are inserted between two grips 21. In particular, the first rotation pin 20a can slide within a pair of slots 22 in the grips 21 so that its distance from the second rotation pin 20b is not constant, but can change. The first 20a and the second 20b pin can further be mutually connected through elastic members, such as for example a pair of springs 23, each one of which is next to each grip 21. The tensioning device 18 is then secured to the basic platform 1, for example by means of a stick (not shown) passing inside a hole 26 of the grips 21. The sizes of the pulleys 19a, 19b and the elasticity constant of the springs 23 are such that, when there is no load on the rope 2, the two pulleys 19a, 19b are in a first position, like the one shown in particular in FIG. 3, in which they contact the rope 2, throttling and stopping it. In this way, should the wind cease while the wing profile 30 is flying, the tensioning devices 18 would prevent the ropes 2 from sliding, keeping them under tension due to the effect of the pull of the elastic cables 17 of the mechanisms for attenuating the sudden load variations. Instead, when unwinding and rewinding the ropes 2, the load is such that the springs 23 allow the relative away-movement of the pulleys 19a, 19b, guaranteeing the normal rolling of the rope 2 on the first pulley 19a. The transmission system shown in the Figures is preferably equipped with two tensioning devices 18, one next to each winch 3.

The blocks 7a assembled on the sliding blocks 6a of the guiding modules 6 of the ropes 2, the blocks 7b placed downstream of such modules 6 and the pair of blocks 7c of the mechanisms for attenuating the sudden load variations have their head fixed, while in the other blocks the head can freely turn. In particular, in blocks 7d which accompany the ropes towards the wing profile 30, it is possible to realise a turning connection to the basic platform 1 realised through at least one spring 25. This allows a great freedom of rotation and this requirement is fundamental in order to be able to accompany the ropes 2 towards the wing profile 30 when the system according to the present invention operates.

The guiding modules 6 are the components of the basic platform 1 which compel the ropes 2 to be orderly wound on the winches 3 and prevent sliding between ropes 2 and grips of the winches 3 and between ropes 2 themselves. Each guiding module 6 is equipped with the sliding block 6a which slides along a rail 6b arranged in parallel with the rotation axis of the respective winch 3. The sliding block 6a is able to translate along the two directions along such rail 6b and the first block 7a is assembled thereon. In particular, sliding of such sliding block 6a is controlled by a sliding mechanism (not shown) which makes it move together with the rotation of the winch 3. Preferably, the sliding mechanism can be screw-driven or belt-driven. In the screw-driven sliding mechanism, the translation of the sliding block 6a along the rail 6b is controlled by the rotation of a ball-recirculation precision screw. In the belt-driven sliding mechanism, the sliding block 6a is assembled on a timing belt.

In the guiding modules 6 of the ropes 2, the translation of the sliding block is controlled by at least one electric motor (not shown) which operates on the sliding mechanism whose operation is governed by the smart control system which controls the wing profile 30.

The system according to the present invention is preferably equipped with two guiding modules 6 of the ropes 2, one next to each winch 3.

The winches 3 are components equipped with spools around which the ropes 2 are wound. The winches 3 are connected, by interposing reducers 4, preferably of an epicyclic type, to generators/electric motors 5. The rotation of each winch 3 is therefore linked to the rotation of a corresponding drive shaft. During the step of generating electric energy, it is the unwinding of the ropes 2 from the winches to impose the rotation of the winches 3. During the recovery of the wing profile 30 instead, the motors actuate the winches 3. The device contains two winches 3, one for each rope 2.

The generators 5 are the components through which the production of electricity occurs. Their actuation occurs due to the winches 3 when unwinding the ropes 2. In the system according to the present invention, the generators 5 also operate as motors, taking care of rewinding the ropes 2 on the winch 3 when it is necessary to recover the wing profile 30. The generators/electric motors 5 are controlled by the smart control system in the modes that will be described below, and the system according to the present invention is preferably equipped with two generators/electric motors 5.

The smart control system is the system through which the wing profile 30 is automatically driven. The main task of such system consists in controlling the operation of the generators/motors 5 and consequently the rotation of the winches 3. Driving of the wing profile 30 in fact occurs by adjusting unwinding and rewinding of the ropes 2 on the same winches 3 through which energy is produced. The ropes 2 that connect the wing profile 30 to the basic platform 2 are therefore both power ropes and driving ropes. The energy generation exclusively depends on the rotation direction of the winches 3: there is a production of electricity when the rotation of the winches is determined by the traction of the ropes 2 and actuates the generators 5. Instead, there is an energy consumption when the rotation of the winches 3 is determined by the engines and allows rewinding the ropes 2. Driving of the wing profile depends both on the rotation direction and on the rotation speed of the winches 3. The wing profile 30 is in fact driven by suitably modifying the wind attachment angle. Such angle depends on the relative position of the wing profile 30 with respect to the wind speed and therefore on the length of each one of the two lengths of unwound rope 2. If, for example, in order to make the wing profile 30 assume a certain inclination, it is necessary to shorten a length of rope 2 unwound with respect to the other, to obtain such result, it will be necessary to accelerate or slow down the rotation of a winch 3 with respect to the other. Without therefore impairing the energy generation or the recovery of the wing profile 30, driving of the wing profile 30 occurs by differentiating the rotation speed of the two winches 3. The automatic check of the flight of the wing profile 30 is performed by means of predictive control algorithms through which the wing profile 30 is driven in order to avoid oscillations, driving instability and local traction maxima. The path or flight trajectory performed by the wing profile 30 is foreseen in order to optimize the produced energy during the operating cycle under maximum safety, complying at a maximum with dynamic specifications and minimizing the necessary time for going from current position to foreseen position. The automatic driving of the wing profile 30 occurs by means of a real time process that receives and processes information coming from the set of ground sensors and on the wing profile 30. It may be necessary to pre-process the data from the sensors on the wing profile on board the wing profile 30, in order not to overload the communication to ground components of the smart control system, particularly if such communication occurs in wireless mode. Input information is related to the position of the wing profile 30, to the accelerations, to the forces (for example, the rope load determined by reading the motor torque 5) and to geometrically defined quantities. The smart control system processes such inputs through predictive algorithms and produces an output which actuates the generators/motors 5 connected to the winches 3.

Processing of input information requires a time interval which is proportional to the length of data analysis. By minimising the length of such interval, the delay, with which the wing profile 30 is driven, is reduced. For this reason, a short-term analysis tends to be privileged. A short-term analysis could however not allow foreseeing a path with optimum time depth. It is therefore important to give priority to an optimum trade-off solution, so that data processing occurs in a short time but enough to allow providing an optimum path length. It is however reasonable to assume that providing a path which is longer than the one described during an operating cycle is useless.

The predictive algorithm implemented by the smart control system determines in each instant the optimum position which the wing profile 30 must occupy in following instants through suitable flight and control parameters (flight height, counterweight dynamics, traction data, safety computation on off-limits areas, structure stress situations, instability or excessive forces, instants in which driving must be performed, . . . ). Each parameter, for every time instant, corresponds with the coordinates of the optimum position (with reference to the parameter) which the wing profile should occupy in such certain instant. Every parameter is also assigned a relative weight whose setting occurs at every instant by means of a retroactive system which corrects the weights of the most critical parameters in order to make the decisions about such parameters more important. Once having collected the best coordinates for each parameter, a vector sum is performed for each time instant considered when foreseeing. Finally, following the introduction of time weights which privilege short-term strategies, optimum coordinates are computed for each time instant. After having provided the coordinates of ideal positions which the wing profile 30 must occupy in following time instants, the real time process determines the best path to be followed by the wing profile 30 to reach these positions. The algorithm used for such purpose uses flight equations, inertias of the wing profile 30 and the percentage of reaction which it can have depending on the traction differential on cables 2, for determining the driving law of the wing profile 30. Through suitable control techniques, driving is calibrated in order to manage oscillation risks and excessive gain due to inertial causes, elasticity of the kinematic chain and measure delay.

The check of rotation of the winches 3 is not the only function performed by the smart control system. As it has been previously said, the system also takes care of actuating the guiding modules 6 of the ropes 2. The motors which actuate such modules by operating on their sliding mechanism, are controlled in order to suitably couple the rotation of the winches 3 with the translation of the sliding blocks 6a of the guiding modules 6. It is therefore by means of the smart control system that speed and translation direction of the sliding blocks 6a are adjusted in order to compel the ropes 2 to be orderly wound on the winches 3 and prevent sliding between ropes 2 and grips of the winches 3 and between ropes themselves.

The smart control system must finally recognise and timely accommodate sudden events such as wind blows and load drops. In case of wind blows, the smart control system intervenes by reducing the ropes 2 tension to avoid that the excessive load damages the system. This occurs by actuating the winches 3 in order to allow a quick unwinding of the ropes 2.

Sudden load decreases are avoided since a scarce tension on the ropes 2 would precipitate the wing profile 30 without any driving chance. If a load drop occurs, the smart control system intervenes by accelerating the rotation of the winches 3 (in case the event occurs when rewinding) or by reversing their rotation direction (if the load drop occurs when unwinding). In such a way, the wing profile 30 control is recovered.

The supply system comprises all necessary components for accumulating and delivering electric energy. In particular, the supply system is equipped with power supplies, transformers and accumulators through which the electricity produced when unwinding the ropes 2 is stored, current is delivered to the motor 5 when recovering the wing profile 30, the electronic components of the system according to the present invention are supplied and electric power is supplied to possible external users.

The operation of all electronic components of the system according to the present invention is controlled by the smart control system in cooperation with the supply system.

From what is stated above it is clear that, with respect to what has been proposed by the current art, the system according to the present invention provides for an innovative control mode of the wing profile 30 since there is no distinction between driving ropes and power ropes, both such functionalities being exerted by the two ropes 2 only. Therefore, there is a single pair of winches 3 which actuates the generators 5 which also operate as motors. While in existing projects, the kite recovery occurs through the same winches through which the production of electricity occurs, in the system according to the present invention it is through the same winches 3 that the wing profile 30 is also driven, not only recovered. The wind attachment angle and the wind front area intercepted by the kite 30 are then controlled by adjusting the length of the section of unwound ropes 2 in order to obtain the maximum power delivery when the wing profile 30 ascends and the minimum energy consumption during the recovery phase.

Figure 4:
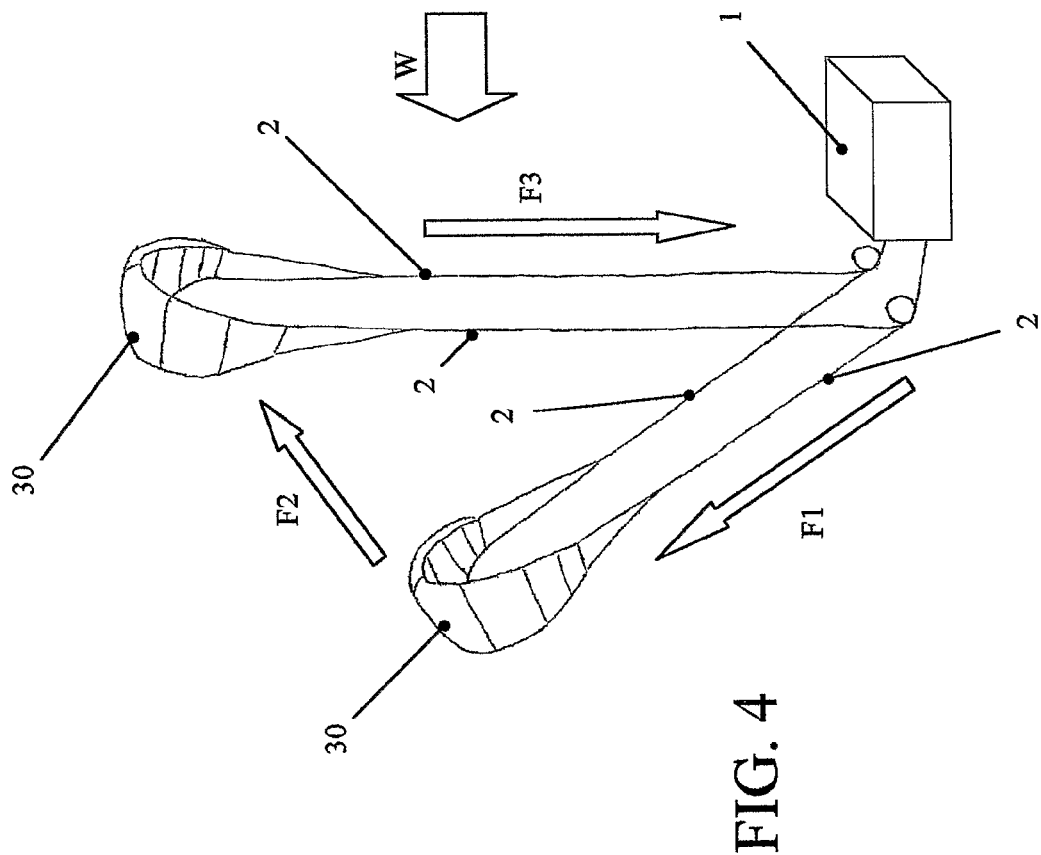
FIG. 4 shows a schematic view of the system according to the present invention in some of its operating steps.
Figure 7:
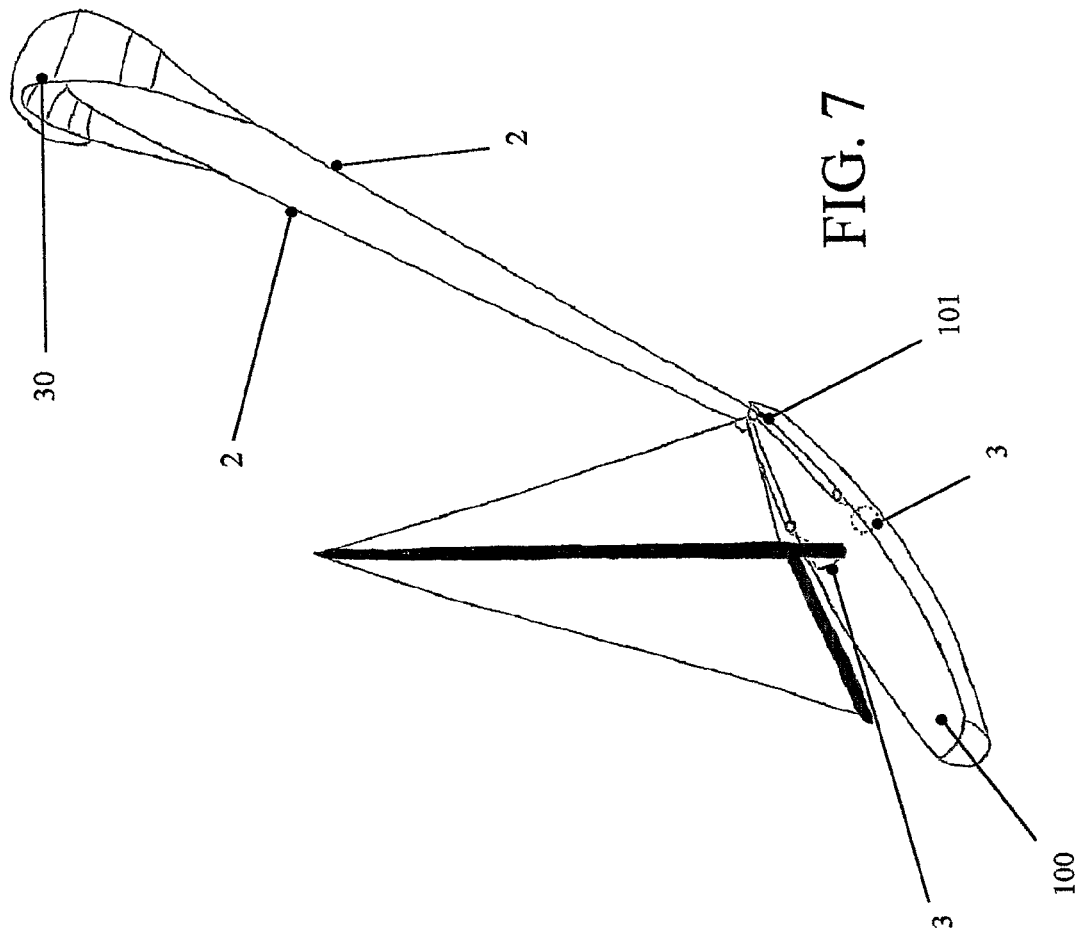
FIG. 7 shows a schematic perspective view of a possible application of the system according to the present invention.

The present invention further refers to a process for producing electric energy through an aeolian system like the previously described one. Substantially, the process according to the present invention which integrates the energy conversion process from aeolian energy to electric energy actuated through the aeolian system according to the present invention is of the intermittent type. With reference in particular to FIG. 4, it is possible to note that the process according to the present invention comprises the following steps:

a) governing F1 the flight trajectory of the wing profile 30, preferably automatically through the smart control system, in such a way that the aeolian energy removed from wind or the aeolian current W, is maximum. In particular, the smart control system drives the wing profile 30 in order to exploit the "lift force", namely the component of the force perpendicular to the wind speed W. In such a way, the wing profile 30 ascends by oscillating or "scanning" across the wind front surface. Consequently, the wind causes the wing profile 30 to ascend, tensioning the ropes 2 connected to the basic platform 1. This traction is converted into rotation at winches 3 level and transmitted by means of the reducer 4 to the generator 5 where, by overcoming the pair of forces opposed thereby, the production of electric energy occurs;

b) driving F2 the wing profile 30, preferably automatically through the smart control system, in order to reach an approximate stall position next to which the aeolian thrust is scarce;

c) rewinding F3 the ropes 2 on the winches 3 by means of the motors 5 which also operate as generators. The ropes 2 are rewound with a minimum energy consumption and, after having ended the recovery of the ropes 2, the wing profile 30 is placed in order to go back to a maximum traction condition;

d) at that time, the process is repeated.

The energy generated when unwinding the ropes 2 is greater than the one spent for their rewinding. The energy balance is therefore positive.

By using the process according to the present invention, and due to the smart control system which, by real-time processing information coming from the set of sensors assembled on the wing profile 30 and the set of ground sensors, it is possible to drive the wing profile 30 in order to make it ascend by mainly exploiting the lift force. In this way, the path followed by the wing profile 30 during every process cycle is optimum in terms of aeolian energy which can be subtracted from the wind by following paths (for example a series of eights) in order to intercept the maximum air volume. The process according to the present invention therefore guarantees not only continuity in producing electricity, but also the optimisation of energy which can be obtained in every cycle with the same size of the wing profile with respect to known systems.

As a proof of the high efficiency demonstrated by the aeolian system and the process according to the present invention, and merely as an example, let us suppose that the wind speed $V_w$ that the wing profile 30 must be able to support (namely without its components being damaged) is 6 m/s. It is further assumed that the maximum speed $V_s$ at which unwinding of the ropes occurs is 4 m/s. The wing profile 30 is free for oscillating by "scanning" across the wind front surface. By driving the wing profile 30 in this way, a speed is obtained with that is much greater than the wind speed. In particular, let us assume that the value of the ratio between speed $V_k$ of the wing profile 30 and wind speed $V_w$ is greater than 10. If the maximum wind speed $V_w$ is 6 m/s, the maximum speed Vk of the wing profile 30 will be 60 m/s. It must not be surprising that the maximum unwinding speed $V_s$ of the ropes 2 is assumed equal to 4 m/s while the maximum speed of the wing profile 30 is 60 m/s. The wing profile 30 in fact, like a common kite, can continuously change its motion direction without this corresponding to an as quick unwinding of the ropes 2.

Let us further suppose that the length of each rope 2, in the instant in which, after having ended its rewinding, the profile is captured by the wind, is 80 meters and that the traction exerted by the aeolian currents implies that the ropes are unwound by approximately 200 meters.

By assuming that the unwinding speed is 4 m/s, the energy production would occur for 50 seconds per cycle (200/4 m/(m/s)). Let us suppose that another 4 seconds are necessary to take the wing profile 30 in an approximate stall position (on azimuth or lateral). In particular, during the first second, there would still be an unwinding of the ropes 2 at an average speed of 2 m/s. During the three remaining seconds, rewinding would start at an average speed of 4 m/s. Globally, during the step of passing into the approximate stall condition, there would occur an unwinding of the ropes of 2 meters (2*1 (m/s)*s) and a rewinding of 12 meters (4*3 (m/s)*s). At the end of such step, the length of the ropes 2 would therefore be 270 meters (280+2−12 m). Now rewinding starts, which takes back the length of the ropes to the initially assumed length of 80 meters. Should rewinding occur at a speed of 8 m/s, it would require a time of 23.75 seconds (190/8 m/(m/s)).

The now described operating cycle corresponds to an hypothetic standard cycle of the process according to the present invention during which the length of the ropes is never shorter that 80 meters. Obviously, there is also an initial starting cycle during which it is necessary to manually unwind the supposed 80 meters of rope (going away from the basic platform 1) and make the kite captured by the aeolian currents. This first cycle is not used for producing electric energy, but to take the aeolian system to its operating state.

Always with reference to the previous example, for safety, the maximum length of each rope 2 should not be shorter than 318 meters. In fact, supposing that there could be wind blows equal to 12 m/s for a length of 4 seconds: for preventing the aeolian system from being damaged, it can be assumed that, in such case, the unwinding speed of the ropes 2 is 8 m/s. The wind blow would then imply an unwinding of the ropes 2 equal to 36 meters (8*4 (m/s)*s).

Taking into account both the rewinding of the ropes 2 when recovering the position of any stall and the safety unwinding which occurs when there are wind blows, with reference to the described example, the maximum rotation speed which the winches 3 must be able to support would be (with reference to the ropes 2) equal to 8 m/s.

Figure 5:
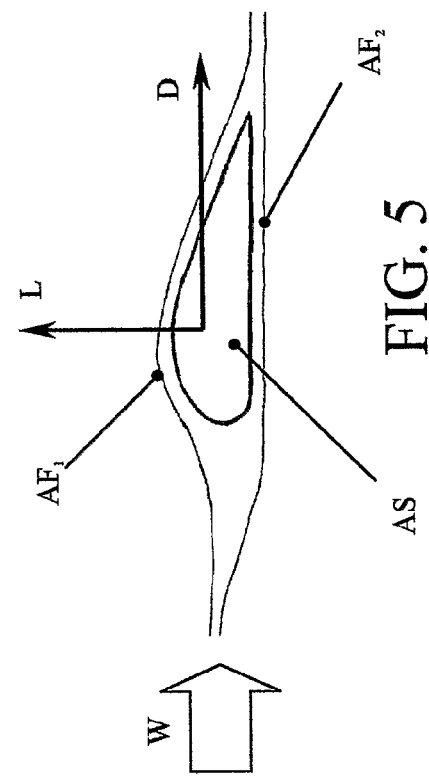
FIG. 5 shows a schematic view of a stationary aerodynamic surface immersed in an aeolian current and the related forces which are generated.

It is also possible now to make some considerations dealing with the power that the wing profile 30 is able to subtract to the wind. For such purpose, and with reference to FIG. 5, it is suitable firstly to deal with system aerodynamics. It is known that, when an aeolian current meets a stationary aerodynamic ("airfoil") surface AS, such current generates two forces: the drag force D parallel to the direction W along which the wind blows and the lift force L perpendicular to such direction W. In case of wind laminar flow, the aeolian currents $AF_1$ which pass over the aerodynamic surface AS are quicker than the $AF_2$ which pass below it, since they must travel a longer distance. This determines a pressure decrease in the upper part of the profile and therefore a pressure gradient which generates the lift force L.

Figure 6:
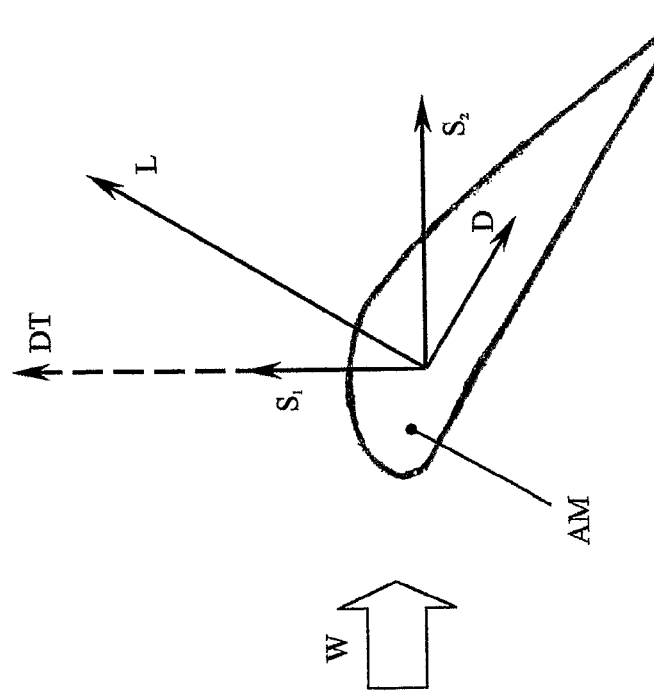
FIG. 6 shows a schematic view of an aerodynamic surface which is free of moving along the perpendicular direction to the wind speed and the related forces which are generated.

Instead, with reference to FIG. 6, it is assumed that the profile AM can move along the direction DT of the lift force. Due to such motion, the lower surface of the aerodynamic profile AM is slanted with respect to the wind speed. In such case, lift force and drag force are respectively perpendicular and parallel to the relative wind speed with respect to the profile.

By designating with $S_1$ the force parallel to the motion direction and with $S_2$ the force perpendicular to such direction, the component of the lift force L parallel to the motion direction has the same sense as the translation of the aerodynamic profile AM while the parallel component of the drag force D has an opposite sense.

For this reason, in order to keep the motion along a perpendicular direction to the aeolian currents, it is suitable to slant the profile AM in order to obtain a high ratio between the component of the lift force L along the motion direction DT of the profile AM with respect to the component of the drag force D.

These considerations are also valid for the wing profile 30 of the aeolian system according to the present invention. The smart control system in fact drives the wing profile 30 in order to keep the ratio between lift force and drag force high during the step of ascending the wing profile 30. In such a way, the wing profile 30 oscillates by scanning the wind front and generating power due to the pull of the ropes 2. The power generated when the wing profile 30 ascends is computed by multiplying the Specific Wind Power by the wind front area intercepted by the wing profile (namely the kite area) A and by the Kite Power Factor KPF, a performance coefficient which depends on the speed ratio between wing profile and wind $V_k/V_w$, and on two coefficients $K_d$ and $K_1$ ($K_d$ refers to the drag, namely when the kite pulls the ground constrain with forces and speeds along the wind direction and $K_1$ refers to the lift, namely when the kite pulls the ground constraint by oscillating in order to scan the wind front surface). As previously stated, it is due to the lift that the kite speed is much greater that the wind speed. The greater the kite power, the higher the lift with respect to the drag.

Always as an example, it can be assumed that $V_k/V_w=10$, $K_1=1,2$ and $K_d=0,1$.

In such case, KPF=20 would be obtained.

Supposing that the air density $\rho$ is constant and equal to 1.225 kg/m$^3$, the Specific Wind Power would be:

$$SpecificWindPower = \frac{1}{2}\rho V_w^3 = 0,5 * 1,225 * 6^3 = 132,3 \; W/m^2$$

The "KitePower" power which can be generated by means of the kite is expressed by the following formula:

KitePower=KPF*Specific Wind Power*A where A is the kite area which intercepts the wind front. If, for example, a wing profile is used having area A=18 m$^2$ pushed at the speed of 60 m/s from a wind which blows at 6 m/s, the power which it is possible to generate at ropes level would be 47628 W. Such power would therefore correspond to the maximum power which the kit is able to generate.

The value assumed by KPF anyway depends on the wing profile efficiency. It is possible to make KPF assume values greater than 20. If for example KPF assumes a value equal to 40, the maximum power which can be obtained from a kite with area equal to 18 m$^2$ would be 95256 W.

With reference to FIG. 8, it is possible to note that the aeolian system according to the present invention finds valid application also in the nautical sector, for dragging boats by exploiting the aeolian energy.

In such case, all previously described components of the system according to the present invention are placed on a sailing or motored boat 100. The transmission system which accompanies the ropes 2 towards the wing profile 30 is placed at prow 101 and the wing profile 30 is driven in order to always be in front of the boat 100.

Differently from the previously described application, the primary objective of the aeolian system does not consist any more in the conversion of aeolian energy into electric energy but in exploiting the wind force for dragging the boat 100 and therefore in converting the aeolian energy into mechanical energy.

Similarly to the previous application, the smart control system is programmed for maximising the energy that the power wing profile 30 is able to subtract to the wind, anyway avoiding that the rope load becomes excessive and damages the components of the aeolian system. The main difference with respect to the previous application consists in that the exploitation of aeolian energy does not occur any more intermittently. In fact, the kite is not driven in order to alternate a step of ascending and a step of recovering obtaining a positive energy balance, but in order to optimise with continuity the exploitation of the aeolian currents. During the steady state operation, the kite 30 recovery exclusively occurs in order to accommodate possible wind drops or to correctly position the wing profile 30. Unwinding and rewinding the ropes 2 does not occur any more with the purpose of cyclically producing energy but only for driving purposes. The ropes 2 through which the wing profile 30 is connected to the boat can still be deemed both as power and as driving ropes 2. Driving occurs according to the same principle described for the previous application. The power transmission does not occur any more by actuating a generator by rotating a winch, but limiting as much as possible the unwinding of the ropes 2 so that the boat 100 to which the wing profile 30 is connected through the ropes 2 moves withg respect to a fixed reference system.

It is possible to note how in both applications the exploitation of aeolian energy is associated with an advancement of the wing profile 30 in space. The difference consists in that, while in the previously described device the observer is integral with the fixed reference system (namely, the ground), in case of application to a boat, the basic platform 1 and the observer follow the kite 30 during its advancement.

Anyway, it is possible to provide for the production of electricity through the aeolian system according to the present invention applied to the boat 100. In fact, when the need of moving ends, similarly to what is described in the previous application, it is possible to use the wing profile 30 for producing electricity. The smart control system in such case will integrate suitable flight limitations of the wing profile 30 to prevent the ropes 2 from getting in contact with other components of the boat 100.

In addition to the previously mentioned advantages, the aeolian system and the process according to the present invention allow obtaining, with respect to what already proposed by the known prior art, other major results; in particular:

the aeolian system is easily adapted to be handled and consequently is efficient for supplying electric energy under emergency situations, such as in case of difficult supply or when the installation site cannot be accessed;

its extremely low cost and operating characteristics enable the device to be used for conventional uses (events, yards, . . . );

the aeolian system is an enabling technology for big-sized stationary generators due to its scalability characteristics;

the aeolian system is able to exploit also high altitude currents, where the greater wind availability and speed ensure a greater energy density with respect to aeolian currents at ground level;

the operating cycle according to the process of the invention is quick, allowing to exploit the aeolian energy of a great air volume with a relatively small wing profile;

the most costly components of the aeolian system are placed at ground level and are protected;

the power is generated due to the exploitation of the axial component of the lift force, this ensuring a greater energy delivery with respect to the drag force exploitation.

The invention claimed is:

1. An aeolian system for converting energy, comprising:
    at least one power wing profile adapted to be driven from the earth and immersed in at least one aeolian current;
    a basic platform placed at ground level and connected through two ropes to said power wing profile, said basic platform comprising at least two winches upon each one of which a respective one of said ropes is unwound or rewound, each of said winches connected to an electric generator/motor and equipped with a guiding module adapted to compel one of said ropes to be orderly wound onto said winch, wherein said basic platform is adapted to drive said wing profile and to convert aeolian energy of said aeolian current into electric or mechanical energy, said two ropes being adapted to transmit forces from and to said wing profile and to be used both for a check of a flight trajectory of said wing profile and for energy transmission; and
    a transmission system adapted to guide each one of said ropes towards said wing profile, the transmission system comprising:
        a first pair of blocks assembled on sliding blocks of said guiding modules of said ropes;
        a second pair of blocks downstream of said guiding modules of said ropes adapted to keep the lengths of said ropes included between said second blocks and said first blocks horizontal; and
        a third pair of blocks adapted to send said ropes towards said wing profile.

2. The aeolian system according to claim 1, wherein said wing profile (30) is adapted to be driven in said flight trajectory by said basic platform (1) in order to be cyclically taken from a position in which a traction exerted by said aeolian current is maximum, to an approximate stall position, on its azimuth or lateral, in which said traction is minimum.

3. The aeolian system according to claim 1, further comprising a smart control system operating on said basic platform adapted to automatically control said wing profile along said flight trajectory.

4. The aeolian system according to claim 3, further comprising a supply system cooperating with said smart control system to manage energy accumulation and delivery.

5. The aeolian system according to claim 3, wherein said smart control system is equipped with a set of sensors placed on said wing profile.

6. The aeolian system according to claim 5, wherein said set of sensors placed on said wing profile sends information in wireless mode to said smart control system.

7. The aeolian system according to claim 5, wherein said smart control system is equipped with a set of ground sensors.

8. The aeolian system according to claim 7, wherein said smart control system operates on said winches for guiding said wing profile along said flight trajectory by implementing a predictive algorithm determining at every instant an optimum position which said wing profile must occupy in at least one following instant depending on flight and control parameters, on said information sent by said set of sensors placed on said wing profile and on said set of ground sensors, giving priority to an exploitation of a lift force generated by said aeolian current.

9. The aeolian system according to claim 1, wherein each of said winches is connected to said electric generator/motor by interposing at least one epicyclic reducer.

10. The aeolian system according to claim 1, wherein said transmission system comprises at least one pair of attenuating mechanisms for attenuating the sudden load variations included between said second and said third pair of blocks.

11. The aeolian system according to claim 10, wherein each of said attenuating mechanism is composed of at least one elastic member anchored at one of its ends to said basic platform and at another of its ends connected to a length of one of said ropes downstream of one of said guiding modules by interposing a fourth block.

12. The aeolian system according to claim 1, wherein said transmission system comprises at least one pair of tensioning devices arranged between said attenuating mechanisms and said third pair of blocks.

13. The aeolian system according to claim 12, wherein said tensioning device is composed of a first and a second pulley, said pulleys being mutually faced and having coplanar rotation axes, said pulleys rotating around a respective first and second rotation pin and being inserted between two grips, said first rotation pin slidably received inside a pair of slots obtained in said grips, said first and second pin being mutually connected through elastic members.

14. The aeolian system according to claim 1, wherein each one of said third pair of blocks are equipped with a turning connection to said basic platform realised through at least one spring.

15. The aeolian system according to claim 1, wherein each one of said sliding blocks slides along a rail in parallel with a rotation axis of one of said winches.

16. The aeolian system according to claim 15, wherein sliding of each of said sliding blocks along one of said rails is controlled by a sliding mechanism together with a rotation of one of said winches.

17. The aeolian system according to claim 16, wherein said sliding mechanism is actuated by an electric motor controlled by said smart control system.

18. The aeolian system according to claim 16, wherein said sliding mechanism is screw-controlled.

19. The aeolian system according to claim 16, wherein said sliding mechanism is belt-controlled.

20. A process for producing electric energy through an aeolian system according to claim 1 the method comprising:
   a) governing said flight trajectory of said power wing profile in order to maximize the aeolian energy to be subtracted from the aeolian current, wherein said power wing profile, when ascending, applies tension to said ropes connected to said basic platform, which causes said winches to rotate;
   b) driving said power wing profile in order to reach an approximate stall position;
   c) rewinding said ropes through said winches by means of said electric generators/motors and placing said wing profile to go back to a maximum traction condition; and
   d) repeating the previous steps.

21. The process according to claim 20, wherein said steps a) and/or b) and/or c) and/or d) occur automatically through said smart control system.

22. The use of said aeolian system according to claim 1, for dragging a boat through a conversion of said aeolian energy into mechanical energy, wherein said transmission system is placed at prow in said boat and said wing profile is driven by said smart control system in order to always be in front of said boat.

* * * * *